F. B. KENDALL.
CORN-MARKER.
No. 175,565.                        Patented April 4, 1876.
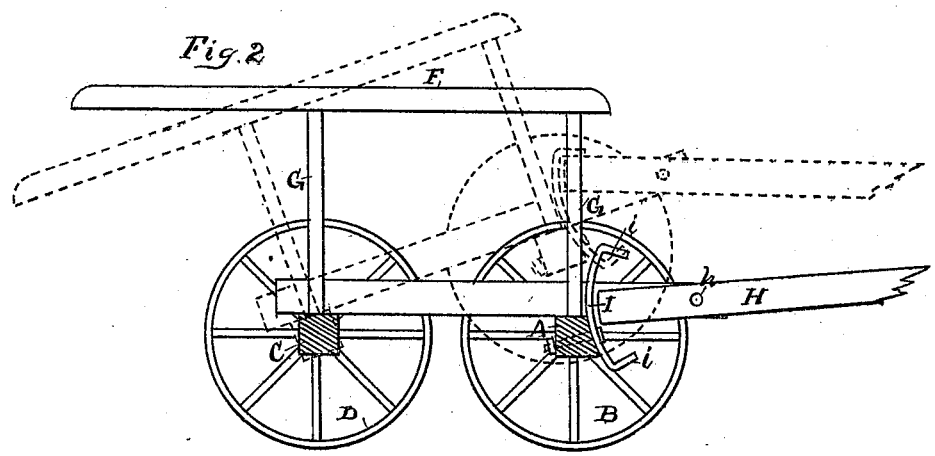
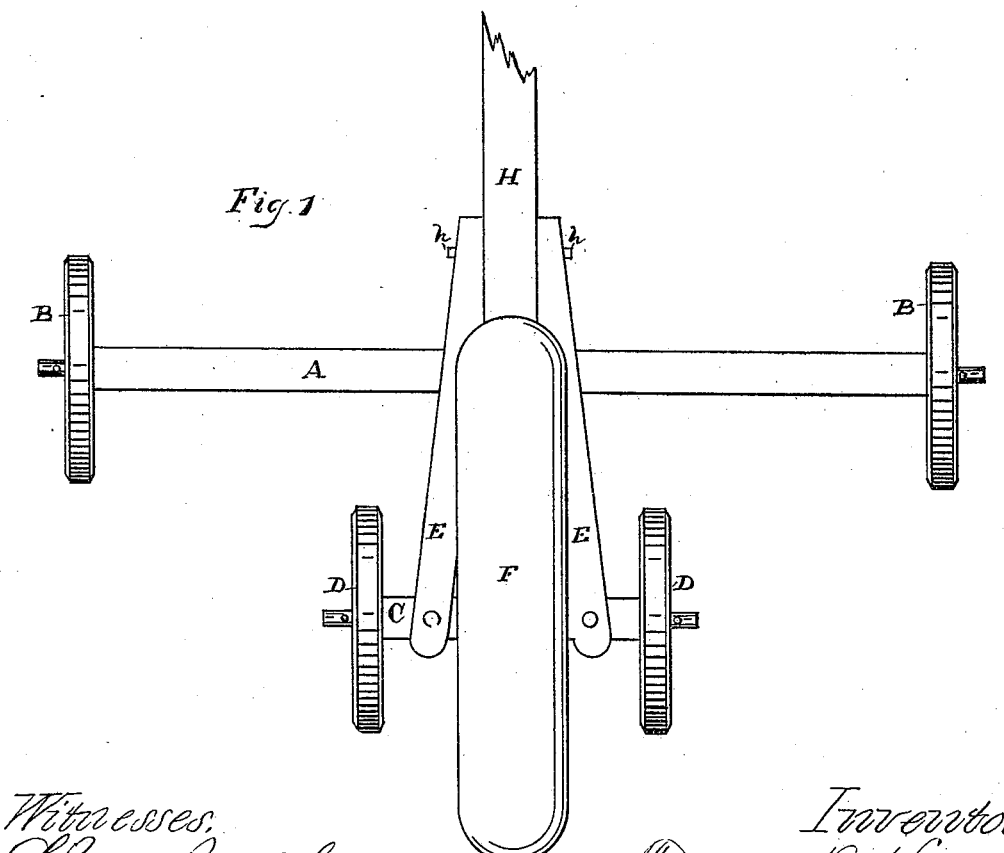

UNITED STATES PATENT OFFICE.

FRANCIS B. KENDALL, OF MONMOUTH, ILLINOIS.

IMPROVEMENT IN CORN-MARKERS.

Specification forming part of Letters Patent No. 175,565, dated April 4, 1876; application filed February 1, 1876.

*To all whom it may concern:*

Be it known that I, FRANCIS B. KENDALL, of Monmouth, county of Warren and State of Illinois, have invented certain new and useful Improvements in Corn-Markers; and I hereby declare the following to be a full, clear, and exact description of the construction and operation of the same, reference being had to the accompanying drawing, making a part of this specification, and in which—

Figure 1 is a top view of a machine embodying my invention; and Fig. 2 is a sectional view of a plane in a line with the near side of the draft-pole.

My invention relates to implements for marking out corn-ground previous to planting; and consists in a new and improved machine upon which the operator rides, the wheels, of which there are four, operating as the markers, so that it marks four rows at once, all of which are necessarily parallel with each other.

Referring to the parts by letters, A represents an axle of a length corresponding with the distance between four rows of corn. B B are wheels arranged to revolve on spindles on the ends of the axle A. C is a shorter axle, its length corresponding to the distance between two rows of corn; and D D are wheels mounted on the ends of the axle C. The shorter axle is arranged behind the longer, and the two axles are rigidly connected by bars E E, the rear ends of which are farther apart than their forward ends, as clearly shown by Fig. 1 of the drawings. F is the drivers' seat, supported on uprights G G, on the axles A and C, and projects some distance in rear of the axle C, as plainly shown in the drawings. H is the tongue or draft-pole. It is pivoted to and between the forward ends of the bars E at *h*, a point some distance from its rear end. I is a curved or arc-shaped bar, having ends *i i*, which are bent forward, as shown in Fig. 1 of the drawings. This bar I is securely bolted to the forward axle A.

The operation of the machine is as follows: The driver sits straddling the seat F, with his feet on the bars E. The axle and wheels being arranged as shown, it will be evident that the wheels will leave four parallel tracks as the machine passes over the ground, the distance between the tracks being equal to that required between the rows of corn. When the machine reaches the end of the field it would require too much space to turn it so as to commence a new series of marks or tracks, were the extended forward axle and wheels required to remain in contact with the ground; but by the driver moving backward onto the part of his seat which projects in rear of the axle C, his weight tilts the machine, and causes the forward axle and wheels to rise above the ground until the rear end of the draft-pole comes in contact with the upper bent end of the bar I, which acts as a stop to prevent further motion in this direction. The machine can then be easily turned upon the rear wheels within the required distance, and again proceed across the field. The lower bent end of the bar I also acts as a stop to prevent the forward end of the tongue from rising too far should the machine be descending a hill or declivity in the field.

What I claim as new, and desire to patent, is—

The long axle A, with wheels B, and short axle C, with wheels D, in combination with the seat F, pivoted tongue H, and bar I, the seat projecting in rear of the axle C, for the purpose of raising the long axle and wheels above the ground, substantially as and for the purpose specified.

In testimony that I claim the foregoing as my own I have hereunto subscribed my name in presence of two witnesses this 23d day of January, 1875.

F. B. KENDALL.

Witnesses:
J. J. TUNNICLIFF,
L. J. BOSWORTH.